United States Patent [19]

Barnett

[11] 4,292,846

[45] Oct. 6, 1981

[54] LIQUID PROPORTIONING CONTAINER

[76] Inventor: Loren A. Barnett, P.O. Box 786, Grove, Okla. 74344

[21] Appl. No.: 90,877

[22] Filed: Nov. 2, 1979

[51] Int. Cl.³ ............................................. G01F 14/00
[52] U.S. Cl. ..................................... 73/427; 206/219; 220/85 SP
[58] Field of Search .................. 73/427, 426; 206/219; 215/365; 222/158, 159; 220/86 R, 82 R, 85 SP

[56] References Cited

U.S. PATENT DOCUMENTS

| | | | |
|---|---|---|---|
| 1,780,875 | 11/1930 | Gordon | 73/427 |
| 2,030,975 | 2/1936 | Fairchild | 73/426 |
| 2,370,668 | 3/1945 | Johnson | 220/85 SP |
| 2,712,396 | 7/1955 | Mowat | 73/427 |
| 2,762,526 | 9/1956 | Gilmour | 73/427 |
| 3,948,105 | 4/1976 | Johnson | 73/427 |
| 4,135,404 | 1/1979 | Butler | 73/426 |

FOREIGN PATENT DOCUMENTS 1536574 12/1978 United Kingdom ............ 220/85 SP

Primary Examiner—Gerald Goldberg
Assistant Examiner—Denis E. Corr
Attorney, Agent, or Firm—John A. Hamilton

[57] ABSTRACT

A liquid proportioning container consisting of a main reservoir and a measuring vessel, the latter being so calibrated that when filled with one liquid to a specified level and its contents added to the main reservoir, and the main reservoir then completely filled with another liquid, said liquids will be mixed in specified proportions. The measuring vessel may constitute an intrinsic portion of the main reservoir, such as a pouring spout or a liquid filtering device therefor or may constitute an integral portion of the main reservoir.

8 Claims, 7 Drawing Figures

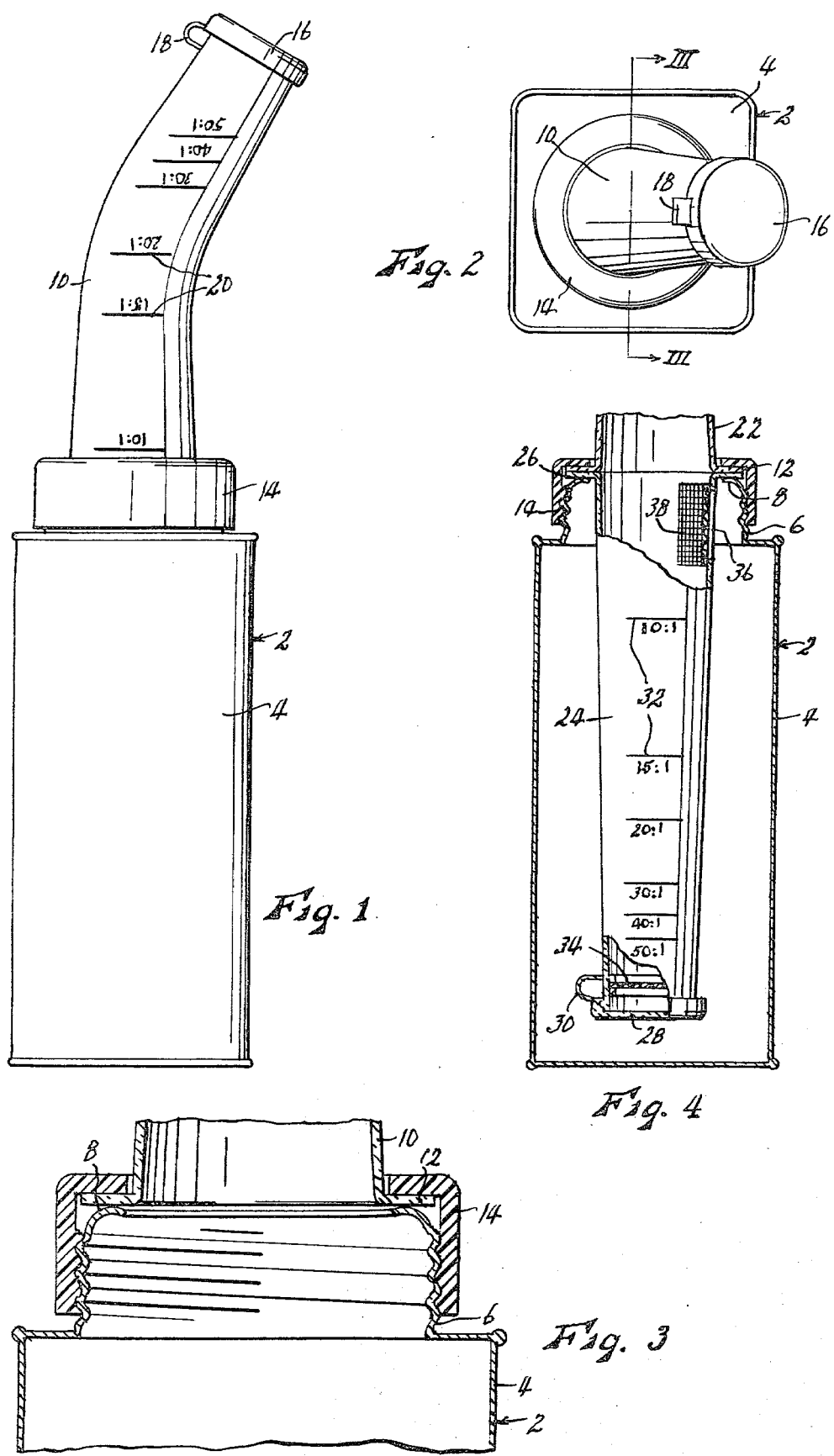

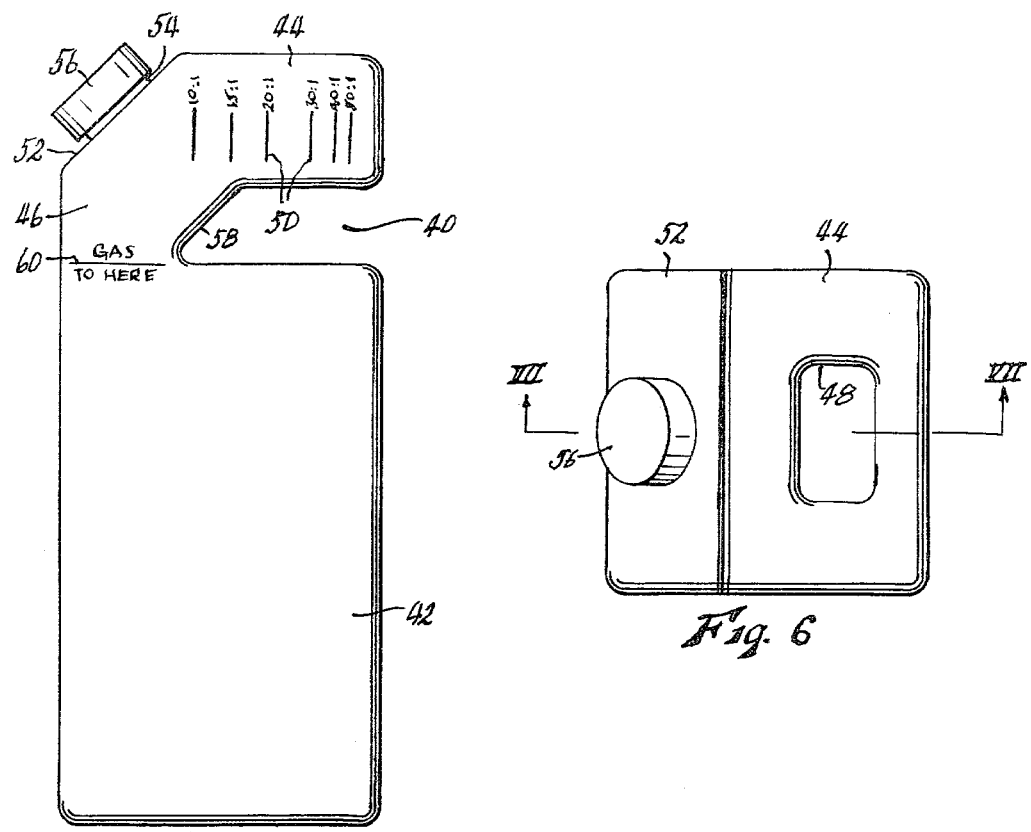
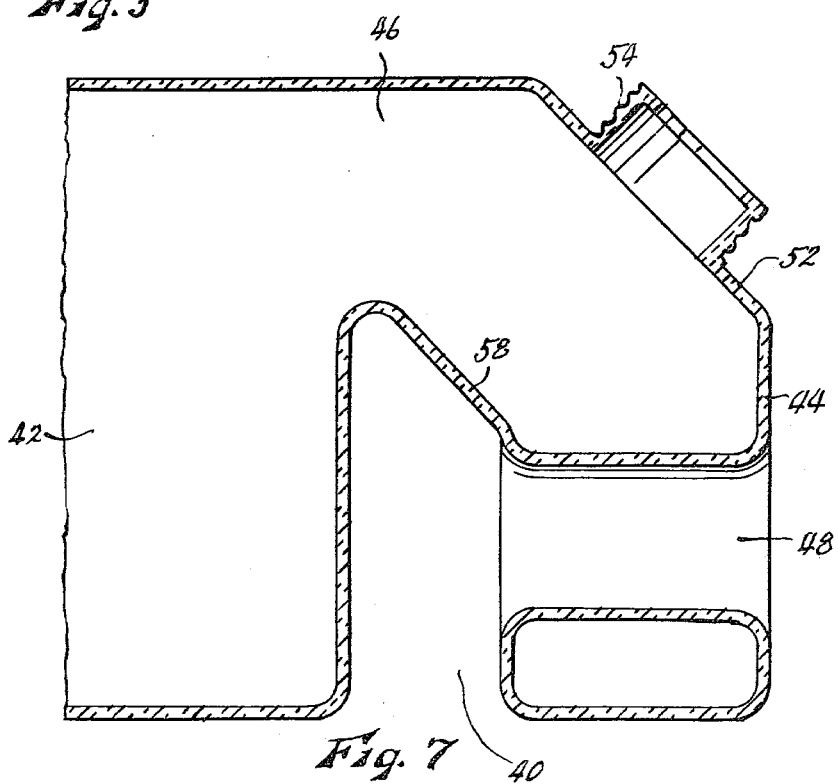

LIQUID PROPORTIONING CONTAINER

This invention relates to new and useful improvements in liquid containers, and has particular reference to a liquid container having novel provisions whereby two or more liquids may be combined therein selectively in any of a wide variety of proportions. It has been developed primarily as an aid in mixing lubricating oil with gasoline, many small two-cycle engines such as are commonly used in lawnmowers, chain saws, golf carts, outboard engines and the like often requiring the use of such a mixture as a fuel, when the engine has no other means of lubrication than the oil introduced with its fuel. However, it will be obvious that the present device is not limited to this particular usage.

The proportions of oil and gasoline required for usage in various engines varies widely. The desired proportions for any given engine are usually given in parts of gasoline to parts of oil, by volume. Common proportions vary perhaps between 10 to 1 and 50 to 1 parts of gasoline to parts of oil, with the most common proportions being in the mid-portion of this range. Gasoline for the stated purposes is most commonly carried in small containers such as half-gallon or gallon cans, within which the gasoline and oil are mixed. The calculation and measurement of the proper amount of oil to add to such a container to provide the desired proportions is often a somewhat bothersome problem involving mathematics and fluid equivalents with which many persons are not familiar, for example to calculate, and measure out the quantity of oil necessary to add to one gallon of gasoline to produce a ratio of, say, 50 to 1 of gasoline to oil. Furthermore, if the container when full will contain only one gallon of liquid, then a 50:1 ratio would permit the addition of only one fifty-first of a gallon of oil, and fifty fifty-firsts of a gallon of gasoline, since the oil then occupies a portion of the container volume. The provision of a container which entirely eliminates any necessity for these often troublesome computations is the principal object of the present invention.

More specifically, one object of the present invention is the provision of a liquid proportioning container consisting of a main reservoir of a given capacity and a measuring vessel, the measuring vessel being so calibrated that when filled with oil to a mark corresponding to the desired gasoline-oil ratio, its contents poured into the main reservoir, and the main reservoir then filled with gasoline, the ratio of oil and gasoline will be in the desired proportion.

Another object is the provision of a container of the character described wherein the measuring vessel forms an intrinsic element of the overall container, such as a pouring spout or liquid filtering device therefor, whereby to avoid loss or misplacement of the measuring vessel.

A further object is the provision of a container of the character described wherein the measuring vessel is integral with and forms a divided portion of the main reservoir, the container having a single filling opening which, when the container is disposed in a non-upright position, directs oil to the measuring vessel, but which directs gasoline to the main reservoir when the container is upright, and allows oil to flow from the vessel to the reservoir.

Other objects are simplicity and economy of construction, and efficiency and dependability of operation.

With these objects in view, as well as other objects which will appear in the course of the specification, reference will be had to the accompanying drawing, wherein:

FIG. 1 is a side elevational view of a liquid proportioning container embodying the present invention, FIG. 2 is a top plan view of the container, FIG. 3 is an enlarged fragmentary sectional view taken on line III—III of FIG. 2, FIG. 4 is a view generally similar to FIG. 1, but shown partially in section and partially in elevation, and illustrating a modification of structure, FIG. 5 is a view similar to FIG. 1 but showing another modification of structure, FIG. 6 is a top plan view of the container shown in FIG. 5, and FIG. 7, is an enlarged, fragmentary sectional view taken on line VII—VII of FIG. 6.

Like reference numerals apply to similar parts throughout the several views, and in FIGS. 1-3, the numeral 2 applies generally to a container embodying the present invention. Said container includes a body portion 4 forming the main reservoir of the container, which as shown constitutes a generally rectilinear can formed of metal or the like, although its shape is a matter of choice. Said can is provided at its top with a threaded filling neck 6, said neck having an inturned peripheral flange 8. A tapered tubular pouring spout 10, formed of a transparent or translucent material such as certain types of plastic, is provided at its larger end with an outturned peripheral flange 12 adapted to seat an neck flange 8, and to be pressed into sealing engagement therewith by a union fing 14 threaded on neck 6. At its smaller end, spout 10 is provided with a removable snap-on cap 16, which may be integral therewith and secured thereto by a flexible hinge flap 18 to prevent accidental loss thereof. The spout is angled as shown in FIG. 1 for easier pouring, and has formed or imprinted thereon calibrating marks 20 at intervals along its length. Said marks are so spaced, and labelled to denote, various gasoline to oil proportions, that when it is detached from can 4 by loosening union ring 14, and inverted with cap 16 closed, then filled with oil to a selected one of marks 20, its contents then poured into the can and the can filled completely with gasoline, the oil and gasoline will then be mixed in the proportions denoted by the labelling of the selected mark 20. The spout may then be reapplied to the can by applying union ring 14, cap 16 opened, and the gasoline-oil mixture dispensed by pouring it through the spout. Union ring 14 could be replaced with an ordinary screw cap when immediate use of the container is not to be made, but closure of cap 16 of the spout serves the same purpose of sealing the container. Spout 10 of course constitutes the measuring vessel portion of the total container. The above description is believed to include a full and complete description of the use and operation of the device. The transparent or translucent material of the spout permits the liquid level therein to be readily observed. The fact that the measuring vessel constitutes an intrinsic portion of container, namely a pouring spout, which has a normal usage aside from its use as a measuring vessel, tends to prevent loss or misplacement thereof during the possibly long periods between refillings of the container.

FIG. 4 shows a modification of structure in which the container is generally identical to that shown in FIGS. 1-3 except that the spout 22, corresponding to spout 10 of FIGS. 1–3 and shown fragmentarily in FIG. 4, need not be formed of transparent or translucent material, and does not carry calibration marks 20, and except that a separate measuring vessel is provided. In this case, the measuring vessel comprises a straight tubular cup 24 formed of transparent or translucent material, and insertable into body 4 through neck 6 thereof. The cup is provided at its upper end with an outturned peripheral flange 26 which may be clamped as shown between union ring 14 and neck flange 8 together with flange 12 of the spout, and is provided at its lower end with an integral removable snap-on cap 28 secured thereto by a hinge flap 30, in the same manner as cap 16 in FIGS. 1 and 2. Also, it is provided externally with calibration marks 32 corresponding to marks 20 in FIG. 1. Adjacent its lower end, cup 24 is provided with a filter screen 34 over its entire area, and at its upon end, adjacent its flange 26, it is provided with an opening 36 at one side thereof, covered by a filter screen 38.

In the use of the FIG. 4 species of the invention, spout 22 and cup 24 are both removed from body 4 by loosening union ring 14, and with cap 28 closed, the cup is filled with oil to the selected calibration mark 32. The oil is then poured into body 4. The spout and cup are then reassembled with the body as shown, after filling the body with gasoline, but with bottom cap 28 of the cup opened. The gasoline-oil mixture may then be poured from spout 22 as before. Cup 24 will fill from the bottom due to the opening of cap 28, so that it does not materially reduce the capacity of body portion 4, and the container may be completely emptied by the passage of the mixture through side opening 36 of the cup. All of the mixture dispensed must be filtered by either screen 34 or screen 38, and this filtration is of course important in the removal of foreign matter which could damage the engine. Here again, the measuring vessel, cup 24, though an element separable from body portion 4, is an intrinsic part of the total container having a continuing use aside from measurement of oil, and therefore is not likely to be lost or mislaid. One advantage of this species of the invention is that cup 24 thereof may be supplied as an add-on unit for use with many pre-existing gasoline cans already in common use, as long as the calibrations thereof are keyed to the capacity of the can.

FIGS. 5–7 show a modification of the container in which both the main reservoir and the measuring vessel constitute different portions of a single integral container. As shown, said container is of a generally rectilinear overall configuration, vertically elongated when in an upright position as shown in FIG. 5, divided by a notch 40 disposed adjacent its upper end and extending inwardly from one side thereof, thereby dividing its interior into a lower body portion 42 constituting the main reservoir, an upper, horizontally elongated portion 44 constituting the measuring vessel, and a neck 46 interconnecting portions 42 and 44 at the side of the container opposite from notch 40. Portion 44 may conveniently serve as a handle, and a slot 48 may be formed vertically therethrough to provide a finger-hold facilitating this function. The entire container is formed of a transparent or translucent material, and portion 44 thereof is provided with external calibration marks 50 corresponding to marks 20 in FIG. 1 and marks 32 in FIG. 4. The volume of portion 44 must be sufficiently large to provide the desired range of ratios of its volume to that of body portion 42, and calibrations 50 must of course be arranged to compensate for the void created by finger slot 48. An upper corner edge of the container wall at the juncture of portion 44 and neck 46 thereof, is angled at about 45 degrees from horizontal, as indicated at 52, and this angled portion is provided with a threaded filling neck 54, to which may be applied either a threaded cap 56, as shown, or a pouring spout such as is indicated in FIG. 4. Said neck is the only opening to or from the interior of the container. The wall 58 of neck 46 disposed directly opposite said neck is also inclined from the horizontal, parallel to but spaced apart from neck wall 52.

In use, the cap 56 is removed and the container turned on its side as shown in FIG. 7. In both positions, neck 54 is directed upwardly so that liquid may conveniently be poured therein. Oil is then poured into portion 44 of the container through neck 54, its passage thereto, rather than to body portion 42, being facilitated by the slope of neck wall 58, to the calibration mark 50 corresponding to the desired gasoline-oil ratio. The container is then returned to an upright position, whereupon the oil flows from portion 44 to portion 42 through neck 46, and portion 42 is then filled with gasoline, also poured in through neck 54, to an indicia mark 60 imprinted on the container at the bottom of neck 46. The desired gasoline-oil ratio will then exist.

While I have shown and described certain specific embodiments of my invention, it will be readily apparent that many minor changes of structure and operation could be made without departing from the spirit of the invention.

What I claim as new and desire to protect by Letters Patent is:

1. A liquid proportioning container comprising:
   a. a main reservoir having a given capacity, and constituting a container having a pouring neck,
   b. a measuring vessel calibrated to be filled with a first liquid selectively to any of a series of predetermined levels, said levels being so determined that when filled to any selected level and its contents added to a second liquid to fill said main reservoir, said first and second liquids will be mixed in proportions determined by the selected calibration of said measuring vessel, said measuring vessel constituting a pouring spout detachably connected at one end to said neck, and
   c. a cap applied removably to the outer pouring end of said pouring spout, whereby to serve as a closure for the entire container.

2. A container as recited in claim 1 wherein said pouring spout constitutes an elongated tubular member having a capacity sufficiently large to contain the maximum quantity of said first liquid which it may be desired to add to said main reservoir, whereby said spout is adapted to receive said first liquid when said cap is applied, and said spout is detached from said main reservoir and held in an inverted position, said spout being calibrated to read the quantity of said first liquid correctly when said spout is disposed in said inverted position.

3. A liquid proportioning container comprising:
   a. a main reservoir having a given capacity, and constituting a container having a pouring neck, and
   b. a measuring vessel calibrated to be filled with a first liquid selectively to any of a series of predetermined levels, said levels being so determined that when filled to any selected level and its contents added to a second liquid to fill said main reservoir, said first and second liquids will be mixed in proportions determined by the selected calibration of said measuring vessel, said measuring vessel constituting an elongated tubular filter cup insertable into said main reservoir through said neck and sealing said neck, said cup having screened openings permitting the flow of liquid from said reservoir and through said cup to said neck.

4. A container as recited in claim 3 wherein said tubular cup is formed of a translucent material whereby to facilitate the reading of liquid levels therein in its use as a measuring vessel.

5. The container as recited in claim 3 wherein at least one of said cup openings is disposed closely adjacent the open end thereof sealed in said neck, whereby to permit pouring of substantially the total contents of said reservoir through said neck.

6. A container as recited in claim 3 having two of said cup openings, one formed by the open lower end thereof and one closely adjacent the open end thereof sealed in said neck, and with the addition of a removable cap closing the lower end thereof to form a bottom for said cup.

7. A liquid proportioning container comprising a normally upright container of integral form divided horizontally to form upper and lower chambers constituting a measuring vessel and a main reservoir respectively, said chambers being interconnected by a neck at one side of said container, said main reservoir chamber being of a given capacity and said measuring vessel chamber being calibrated to be filled with a first liquid selectively to any of a series of predetermined levels, said levels being so determined that when filled to any selected level and its contents added to a second liquid to fill said main reservoir chamber, said first and second liquids will be mixed in proportions determined by the selected calibration of said measuring vessel chamber, said container having a single pouring and filling neck disposed at the top thereof and at the same side thereof as said interconnecting neck, whereby when said container is placed in a non-upright position on its side, with said interconnecting neck uppermost, liquid poured into said filling neck will enter said measuring vessel chamber of the container, and when said container is moved to an upright position, both liquid from said measuring vessel chamber, and any additional liquid poured into said filling neck, will enter the reservoir chamber of said container.

8. A container as recited in claim 7 wherein said filler neck is angled obliquely upwardly and outwardly from the side of said container at which it is disposed whereby to open upwardly whether the container is in said upright or said non-upright position.

* * * * *